US011076102B2

United States Patent
LeBeau

(10) Patent No.: US 11,076,102 B2
(45) Date of Patent: Jul. 27, 2021

(54) THERMAL IMAGING SYSTEM WITH MULTIPLE SELECTABLE VIEWING ANGLES AND FIELDS OF VIEW FOR VEHICLE APPLICATIONS

(71) Applicant: Seek Thermal, Inc., Goleta, CA (US)

(72) Inventor: Tim LeBeau, Santa Barbara, CA (US)

(73) Assignee: Seek Thermal, Inc., Goleta, CA (US)

( * ) Notice: Subject to any disclaimer, the term of this patent is extended or adjusted under 35 U.S.C. 154(b) by 0 days.

(21) Appl. No.: 17/028,717

(22) Filed: Sep. 22, 2020

(65) Prior Publication Data
US 2021/0092299 A1    Mar. 25, 2021

Related U.S. Application Data

(60) Provisional application No. 62/905,172, filed on Sep. 24, 2019.

(51) Int. Cl.
*H04N 5/232* (2006.01)
*B60R 1/02* (2006.01)
(Continued)

(52) U.S. Cl.
CPC ......... *H04N 5/23296* (2013.01); *B60R 1/025* (2013.01); *B60R 11/04* (2013.01);
(Continued)

(58) Field of Classification Search
None
See application file for complete search history.

(56) References Cited

U.S. PATENT DOCUMENTS

| | | | |
|---|---|---|---|
| 7,381,952 | B2 | 6/2008 | Teich et al. |
| 7,697,028 | B1 | 4/2010 | Johnson |

(Continued)

FOREIGN PATENT DOCUMENTS

| | | |
|---|---|---|
| CN | 107757477 | 3/2018 |
| EP | 3495211 | 6/2019 |
| WO | WO 2017/108221 | 6/2017 |

OTHER PUBLICATIONS

"Thermal imaging camera based on human vision from Flir," May 27, 2007, https://www.securityworldmarket.com/na/Newsarchive/thermal-imaging-camera-based-on-human-vision-from-flir.

(Continued)

*Primary Examiner* — Rebecca A Volentine
(74) *Attorney, Agent, or Firm* — Knobbe Martens Olson & Bear LLP

(57) ABSTRACT

Systems and methods to improve safety and more efficient Advanced Driver Assistance Systems (ADAS) and autonomous vehicle (AV) systems for vehicular operation through the application of multiple thermal sensors arranged in systems where the resolution, Field Of View (FOV), and aiming angle of individual sensors are varied. In particular two configurations are discussed in detail, a three-sensor arrangement for forward and forward off angle data acquisition, and a two or three sensor arrangement for blind spot and pinch point awareness for towing applications. In some forward-looking three-sensor embodiments, the center sensor may provide a high-quality narrow field of view of radiometric data for use with tracking algorithms to identify pedestrian and large animal targets for long range driver identification. The side sensors may provide radiometric data for peripheral vision on short/medium range approaching targets for situational awareness at crosswalks and turning corners.

20 Claims, 14 Drawing Sheets

(51) Int. Cl.
*B60R 11/04* (2006.01)
*H04N 5/225* (2006.01)
*B60R 11/00* (2006.01)

(52) U.S. Cl.
CPC .... *H04N 5/2253* (2013.01); *B60R 2011/0092* (2013.01); *B60R 2300/105* (2013.01); *B60R 2300/802* (2013.01); *B60R 2300/8033* (2013.01)

(56) References Cited

U.S. PATENT DOCUMENTS

| | | | |
|---|---|---|---|
| 7,965,314 | B1 | 6/2011 | Miller et al. |
| 8,581,982 | B1 | 11/2013 | Haley et al. |
| 10,091,439 | B2 | 10/2018 | Högasten et al. |
| 2002/0057279 | A1 | 5/2002 | Jouppi |
| 2005/0134710 | A1* | 6/2005 | Nomura ............. H04N 5/23296 348/240.99 |
| 2006/0018513 | A1 | 1/2006 | Sogawa |
| 2010/0295945 | A1* | 11/2010 | Plemons .............. H04N 5/2252 348/148 |
| 2014/0055616 | A1 | 2/2014 | Corcoran et al. |
| 2014/0160290 | A1* | 6/2014 | Wu ........................... B60R 1/00 348/148 |
| 2016/0214534 | A1* | 7/2016 | Richards ............... H04N 13/204 |
| 2017/0305360 | A1* | 10/2017 | Zajac ....................... G01C 3/08 |
| 2017/0341583 | A1* | 11/2017 | Zhang ...................... B60R 1/00 |
| 2017/0363949 | A1 | 12/2017 | Valente et al. |
| 2018/0288320 | A1 | 10/2018 | Melick |
| 2019/0003984 | A1* | 1/2019 | Kester ................... G01J 3/2823 |
| 2020/0064483 | A1* | 2/2020 | Li ........................... G01S 17/87 |

OTHER PUBLICATIONS

"Flir WideEye Fixed Lens Thermal Imaging Camera," Pro Security Access, http://www.prosecurityaccess.com/flir/security/fixed/wideeye.htm.

PCT Search Report and Written Opinion for PCT/US2020/052012, dated Dec. 17, 2020 in 16 pages.

* cited by examiner

THERMAL IMAGING SYSTEM WITH MULTIPLE SELECTABLE VIEWING ANGLES AND FIELDS OF VIEW FOR VEHICLE APPLICATIONS

CROSS-REFERENCE TO RELATED APPLICATIONS

This application claims the benefit of U.S. Provisional Application Ser. No. 62/905,172, filed Sep. 24, 2019, entitled THERMAL IMAGING SYSTEM WITH MULTIPLE SELECTABLE VIEWING ANGLES AND FIELDS OF VIEW FOR VEHICLE APPLICATIONS, which is incorporated herein by reference in its entirety.

FIELD

The present disclosure generally relates to imaging systems including thermal imaging sensors, and in particular to the application of thermal sensors to vehicle operation.

BACKGROUND

The increasing availability of high-performance, low-cost uncooled thermal imaging devices, such as those based on bolometer focal plane arrays (FPAs), is enabling the design and production of consumer-oriented thermal imaging cameras and sensors capable of quality thermal imaging. Such thermal imaging systems have long been expensive and difficult to produce, thus limiting the employment of high-performance, long-wave imaging to high-value instruments, such as aerospace, military, large-scale commercial, and automotive applications. Thermal imaging systems of a given design produced in quantity may have different design requirements than complex military or large industrial systems.

SUMMARY

The systems and methods of this disclosure each have several innovative aspects, no single one of which is solely responsible for its desirable attributes. Without limiting the scope as expressed by the claims that follow, its more prominent features will now be discussed briefly.

Systems and methods may be provided that improve safety and more efficient Advanced Driver Assistance Systems (ADAS) and autonomous vehicle (AV) systems for vehicular operation through the application of multiple thermal sensors arranged in systems where the resolution, Field Of View (FOV) and aiming angle of individual sensors are varied. In particular two configurations are discussed in detail, a three-sensor arrangement for forward and forward off angle data acquisition, and a two or three sensor arrangement for blind spot and pinch point awareness for towing applications. In some forward-looking three-sensor embodiments, the center sensor may provide a high-quality narrow field of view of radiometric data for use with tracking algorithms to identify pedestrian and large animal targets for long-range driver identification. The side sensors may provide radiometric data for peripheral vision on short/medium range approaching targets for situational awareness at crosswalks and when approaching or turning corners.

In one aspect, a system for enhancing vehicular operation may be provided, including: a sensor carrier configured for mounting to at least one selected location on a vehicle; at least two thermal imaging sensors, each sensor comprising an thermal imaging Focal Plane Array (FPA) and associated interface and signal processing elements, each FPA including a number of pixels defining the image resolution of the FPA, configured for mounting to the sensor carrier; optics associated with each sensor defining the Field of View (FOV) of each sensor; wherein, one sensor with a first number of pixels and a first defined FOV is disposed in the carrier at a first viewing angle, and a second sensor with at least one of the same or a different number of pixels and a second defined FOV disposed in the carrier at a second viewing angle.

In one embodiment of the first aspect, the sensor configuration may include one or more of; a camera core with shutter and optics; a shutterless camera core; a microchip mounted to a substrate. In another embodiment of the first aspect, the carrier configuration may include one or more of; a separate package configured to mount at least one of cores, optical elements, or substrates; mounting provision in another vehicle element. In one embodiment of the first aspect, the system may further include three sensors, wherein one sensor may be configured to be higher resolution compared to the other two sensors, with a narrower FOV than the other two sensors, disposed with a viewing axis aligned substantially to the vehicle's forward orientation, and the other two sensors may be lower resolution, with a wider FOV disposed with viewing axes at an angle to both sides of the vehicles forward orientation.

In another embodiment of the first aspect, the forward looking sensor may be configured to have a FOV angle of less than 30 degrees, including 24 degrees and the angled sensors have a viewing axis of greater than 20 degrees, including the range of 28 to 30 degrees from the forward looking sensor viewing axis, and a FOV of greater than 45 degrees, including 55 degrees. In one embodiment of the first aspect, the forward looking sensor may be configured to have a FOV angle of substantially 24 degrees and the angled sensors may have a viewing axis of substantially within the range of 28 to 30 degrees from the forward looking sensor viewing axis, and a FOV of substantially 55 degrees.

In another embodiment of the first aspect, the forward-looking sensor may be configured to view a range of less than 600 feet, and the side looking sensors are configured to view a range of less than 200 feet. In one embodiment of the first aspect, the forward-looking sensor may be configured to view a range substantially within 378 to 573 feet, and the side looking sensors may be configured to view a range substantially within 101 to 161 feet. In another embodiment of the first aspect, the forward-looking sensor may include a QVGA FPA and the two side looking sensors may include a 200×150 pixel FPA.

In one embodiment of the first aspect, image data acquired by the sensors may be provided to a vehicle control/display system and acquired sensor data may be at least one of; displayed simultaneously to a driver; selectively displayed to a driver; or processed to provide at least one of driver warnings or assisted driving actions. In another embodiment of the first aspect, sensor viewing angle may be adjusted in both orientation relative to forward vehicle axis and relative to the plane of the road to account for mounting position on the vehicle and desired FOV. In one embodiment of the first aspect, the adjustments may be at least one of fixed at installation or dynamically adjustable during use.

In another embodiment of the first aspect, the system may be configured as at least one of; at least one sensor directly forward looking and at least one sensor looking off angle to the forward looking sensor, mounted to view forward; at least one sensor looking backward and at least one sensor looking off angle to the rear viewing sensor, mounted to at least one of the rear or to one side of a vehicle; or a plurality of sensors mounted to look at 360 degrees around the vehicle, and mounted and aimed to cover desired FOV's. In one embodiment of the first aspect, the sensor configuration may be three shutterless thermal camera cores mounted in a package whose footprint is less than 20×40 mm. In another embodiment of the first aspect, the sensor configuration may be three shutterless thermal camera cores mounted in a package whose footprint is substantially 16×36 mm.

In one embodiment of the first aspect, the system may be powered by and interfaced to the vehicle's control and display system, and is designed into the vehicle. In another embodiment of the first aspect, the system may be an aftermarket accessory and is at least one of configured with a dedicated processor and display or interfaced to the vehicle control/display system. In one embodiment of the first aspect, the sensors may be battery powered configured for the placement of the sensors in a temporary location depending on need and the system is wirelessly interfaced to at least one of a dedicated controller or the vehicle controller.

In another embodiment of the first aspect, the system may include a mount on the forward end of the roof configured to minimize the collection of debris as housing placement on the front of the roof provides access to the windshield fluid system for cleaning. In one embodiment of the first aspect, the optics may include at least one lens as an exterior element, comprising a diamond-like coating (DLC) on at least the exterior facing portion of the lens.

In a second aspect a method may be provided for using sensor systems as described above to enhance vehicle operation, given the system may be interfaced to a vehicle control and display system, including: producing at least one of thermal images or thermal image derived data of space in front of a vehicle and of the space to the forward right and left of the vehicle; and providing at least one of thermal data display, warnings, or driver assist operations if objects are detected in the direction of travel or in the direction of an indicated turn.

In a third aspect method may be provided of using any combination of the sensor systems as described above to enhance operation of vehicles engaged in towing, given the system may be interfaced to a vehicle control and display system, including: producing at least one of thermal images or thermal image derived data of space directly to the rear right of a vehicle using a lower FOV sensor and of the space to the rearward right of the vehicle using an angled higher FOV sensor; and providing at least one of thermal data display, warnings, or driver assist operations if objects are detected in to the rear or in the direction of an indicated turn.

BRIEF DESCRIPTION OF THE DRAWINGS

The above-mentioned aspects, as well as other features, aspects, and advantages of the present technology will now be described in connection with various implementations, with reference to the accompanying drawings. The illustrated implementations are merely examples and are not intended to be limiting. Throughout the drawings, similar symbols typically identify similar components, unless context dictates otherwise.

DETAILED DESCRIPTION

The following description is directed to certain implementations for the purpose of describing the innovative aspects of this disclosure. However, a person having ordinary skill in the art will readily recognize that the teachings herein can be applied in a multitude of different ways.

Generally described, embodiments of the present disclosure relate to applying thermal imaging to vehicles. Thermal imaging has the potential to provide significant safety advantages for moving vehicles. In particular, at night or within limited visibility zones, thermal imaging has the potential to provide discrimination of type of objects not possible with other vehicle sensors. An example is a person who is in a position where they could potentially be in a vehicle's path but are currently not illuminated by headlights, such as a child off to the side of a road at night. Visible imagers, radar, or LIDAR may all detect the child, but often will not be able to determine whether it is a person, or an inanimate object such as a fire hydrant. For such a situation, the vehicle operator may decide to turn just as the child starts to move and by the time the child is positively identified under headlight illumination, it may be too late to avoid contact. This is just one of many examples of how thermal imaging may provide additional crucial information to that currently available to drivers.

In the past, the expense and complexity of interpreting thermal data have limited the adoption of mass market thermal imagers for vehicles. Recent advances in thermal imaging technology have greatly reduced the cost, size, and environmental susceptibility of thermal imaging sensors while the ability to extract and present usable information from thermal images has increased. It is now reasonable to contemplate vehicle solutions involving thermal imaging that are suitable for automotive use in terms of ruggedness and environmental resistance. With the decreased cost and size, it is also possible to contemplate thermal imaging solutions that may entail a plurality of sensors which can be configured specifically to real world vehicle situations. For applying thermal imaging sensors to vehicle operations, it may be desirable to mix multiple sensors of differing characteristics to provide more complete thermal information about the space a vehicle is traveling through.

In general, the present disclosure addresses multiple integrated thermal sensors encompassing simultaneous fields of view, and in particular embodiments, including wide horizontal peripheral vision and narrow down-the-road vision for a high-performing ADAS, Automatic Emergency Braking (AEB), and/or autonomous vehicle (AV) cost-effective Exterior Far Infrared Imaging system.

Figure 1:
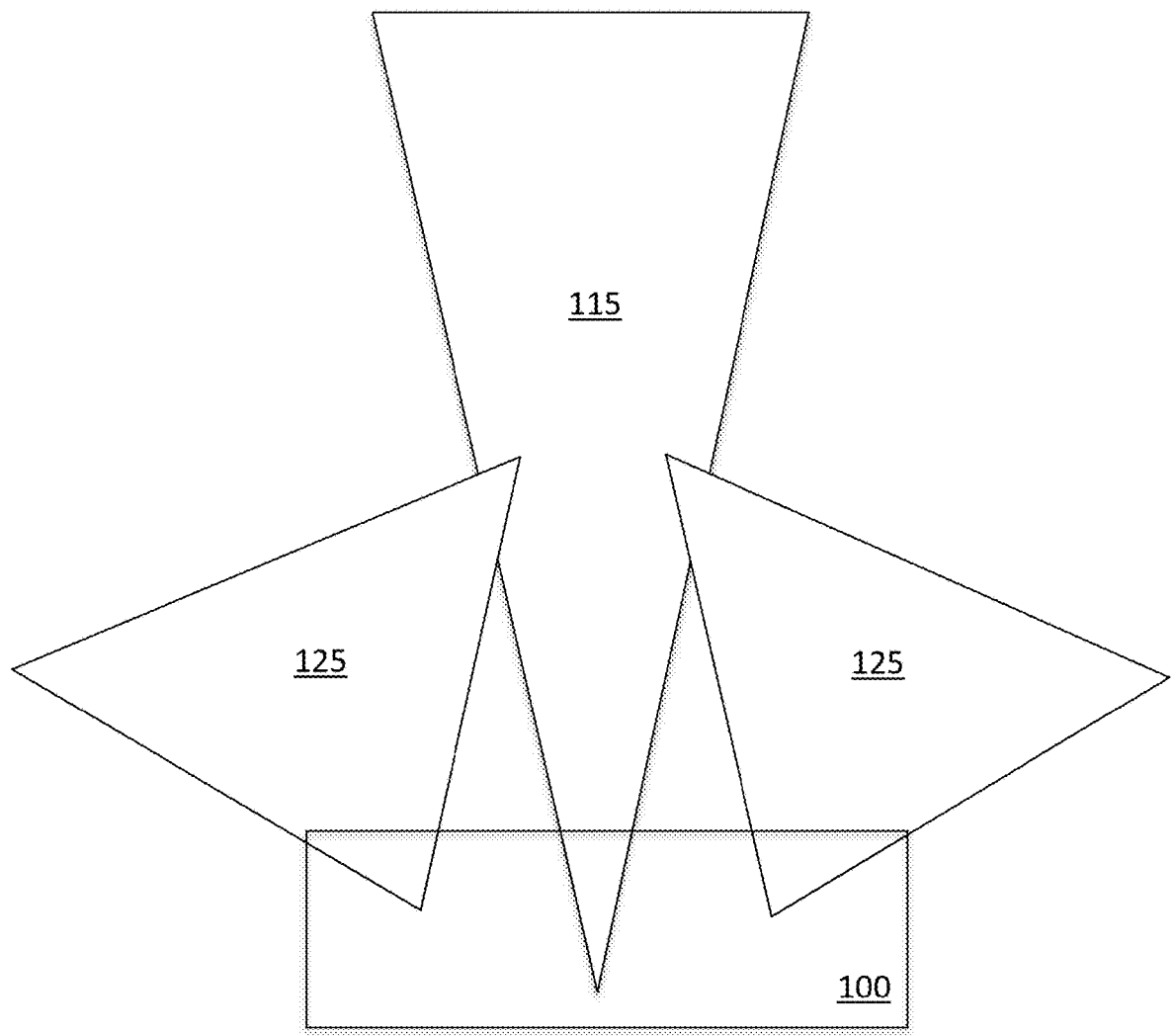
FIG. 1 illustrates a general arrangement of an example multi sensor/multi FOV imaging system.

FIG. 1 shows a general depiction of some example embodiments presented in this disclosure. A thermal imaging system 100 suitable for forward looking in a vehicle is shown. There are three areas that are particularly relevant. The forward FOV 115 is in the direction the vehicle is currently pointed. Relevant information to the driver in this FOV should preferably be good out to a long range, say several hundred feet (e.g., all or part of the usable headlight range, which may be as much as 1000 feet out). It should preferably be high resolution to provide early discrimination at high speeds. Thus, a narrow FOV, with potentially a high-resolution imager, may be most suitable for the direct ahead view.

Also shown in FIG. 1 are two side FOV's 125. The side FOV's 125 represent a space that the vehicle could possibly occupy in the near future, such as in making a left or right turn. The requirements for these FOV's may be different than for the forward FOV 115. It is less important to see a long distance at high resolution and more important to view a wide area with enough resolution to identify the heat signature of a living body within the rather large area that a turning car can potentially occupy during a turn or the space to the side of the vehicles forward motion where living bodies can step out of the darkness without warning. Thus, the side FOV's should preferably be wide, can be shorter, and since objects of interest in these FOV's may often be closer to the vehicle, high resolution may be less important.

With these issues in mind, it is possible that the solution for forward looking thermal imaging driver assistance may not be adequately provided by a single imager with one set of range/FOV defining optics.

Figure 2:
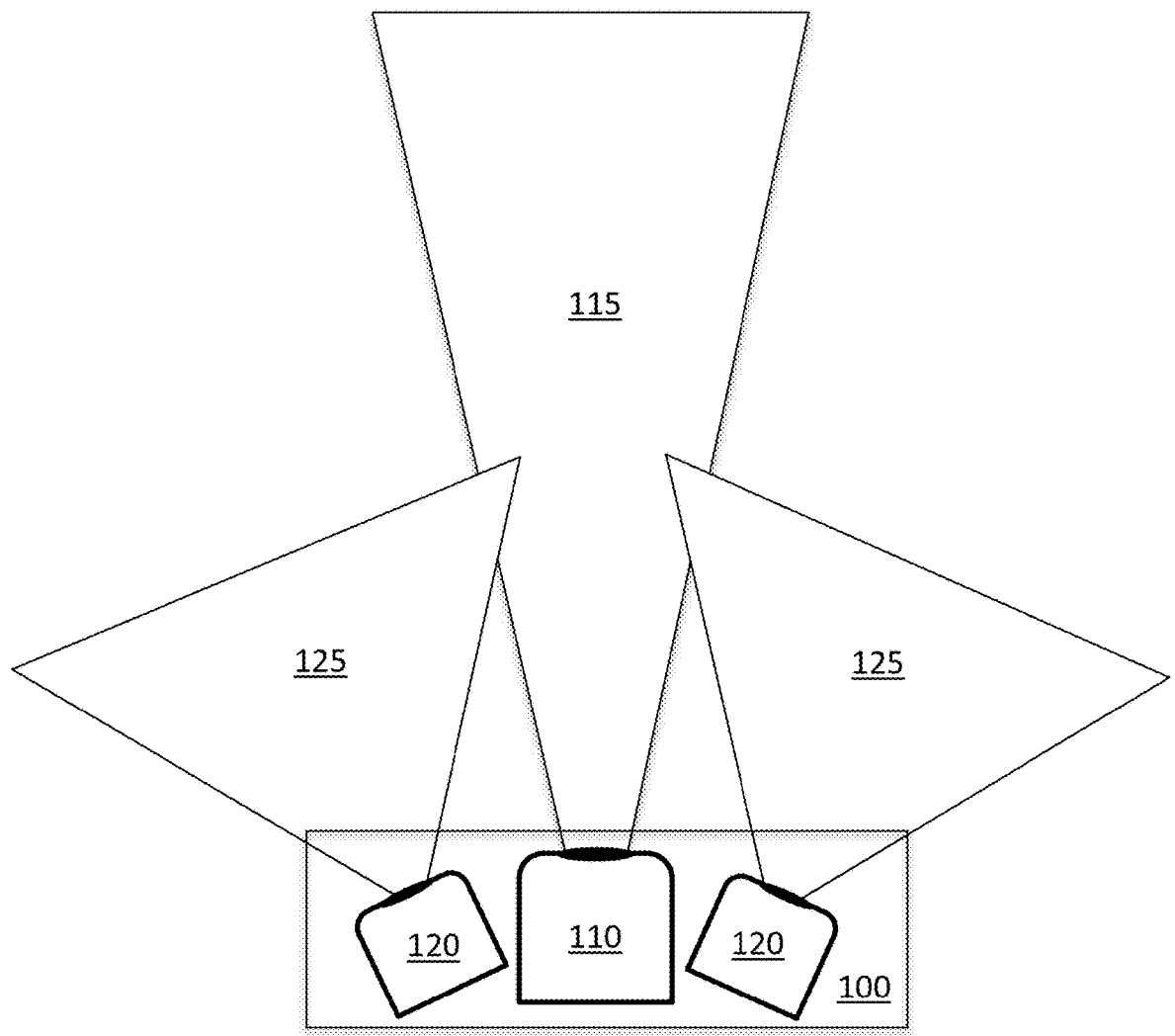
FIG. 2 illustrates details of an example multi sensor/multi FOV imaging system.

FIG. 2 shows an approach to a thermal imaging solution to the forward-looking driving scenario. In FIG. 2, there are three imaging sensors which may be of two types 110 and 120. Three sensors is a useful configuration for forward-looking applications, for example, but other numbers of sensors and/or sensor types are possible. It is envisioned that these sensors are based on microbolometer based Focal Plane Arrays which can be produced cheaply and economically, and have suitable characteristics for long wave thermal imaging. Such FPA's are sold in quantity by the owner of the current disclosure and are discussed in detail in a number of patents and patent applications owned by the owner of the current disclosure as well as numerous other patent and non-patent publications. It is envisioned that these FPA's are packaged in a carrier, which could be a purpose-dedicated housing just for the FPA's containing the FPA's and any associated optics and interface electronics for power and communication with a controller and/or display. It is also possible that the carrier could be designed to mount into an existing vehicle element such as a forward-looking visible camera mounting. Various carrier configurations are possible and in and of themselves are not critical to the scope of the present disclosure.

Although other integration scenarios are possible and useful, as will be described later in this disclosure, for simplicity for the time being we will discuss the vehicle thermal imaging system for the scenario where the thermal imaging system is part of the vehicle design, and is permanently mounted in a suitable location, and is powered by the vehicle and is controlled by and communicates thermal image data to the vehicle control and display system. In other embodiments of the present disclosure, the thermal imaging system may be a modular or third-party addition to a vehicle, may be mounted temporarily within the vehicle, and/or may include an independent power source.

The FPA's themselves may be packaged in a variety of ways. As typical FPA's are microchips, they could be mounted in the carrier directly onto substrates mounted to the carrier, and the various optics and associated connecting and hardware residing on the carrier. Such a solution may be the smallest, least expensive approach. An alternative, but faster to implement, approach that still meets the size and cost requirements is to provide the FPA's as part of a camera core. Such cores are also delivered in quantity and discussed in many patent and non-patent publications by the current disclosure owners. Basically a camera core is a package containing the various elements needed to operate the FPA's and may include some or all of power conditioning, optical elements such as lenses, shutters, apertures and FOV limiting bores, clock generation, and in the most useful scenarios significant local processing that in many cases the interface from the vehicle to the core may be as simple as power in, video out, and possibly a few parallel or serial control lines. Some automotive video interfaces include the option of embedded camera control within the video data communications scheme. The signal processing to create usable image data may be accomplished in the core in some cases. At any rate, as modern vehicles are already set up to include exterior camera image data to use for driver assistance and/or display, integrating video streams of thermal image data is practical for modern vehicles.

A particularly applicable core suitable for the embodiments of the current disclosure is a shutterless microcore, of a type described in PCT Application No. PCT/US2018/038606. These particular cores are approximately cube shaped and easy to mount, inexpensive, very small, less than 0.5 "on a side, and have built in optics. So, one implementation of system 100 is to use three microcores for elements 110 and 120, packaged in a housing or carrier with their lenses pointing in the desired directions, and their signals rerouted to the vehicle controller.

A shutterless core may be less expensive, more rugged and more reliable than a shuttered system. Moreover, shutterless cores are not subject to the intermittent "blindness" that affects shuttered cores during the frames that the shutter is closed. This means shutterless cores have the potential to be more reliable and safer to use in a fast-moving automotive environment. To make up for the lack of shutter-based non-uniformity correction (NUC), the shutterless designs may implement one or a combination of calibration based and/or scene based NUC as described in the co-pending PCT Application No. PCT/US2018/038606.

Accordingly, for the case shown in FIG. 1, there may be one imaging sensor 110 for the center direction and two imaging sensors 120 for the side looking directions. The center imaging sensor FOV 115 may need to be long range and high resolution, but not necessarily very wide. Thus, it is envisioned that the center imaging sensor 110 may possibly have higher pixel resolution (e.g., more pixels on the FPA), but regardless of pixel resolution, its optics may be configured for a narrower FOV 115 compared to the side-aimed imagers. Side or peripheral imaging sensors 120 may have relatively wider FOVs 125 and may optionally have corresponding lower resolution. Thus, the use of multiple sensors with different FOVs/resolutions allows for a tailored solution to the forward-looking vehicle thermal imaging scenario. Details of each sensor's resolution, aiming angle, and FOV will be discussed later for some particular embodiments, but the base concept supports a wide range of application dependent implementation details. Of course, it is possible to configure FOV and resolution with optics and not necessarily needing to use FPA's of different pixel counts or other physical differences.

Figure 3:
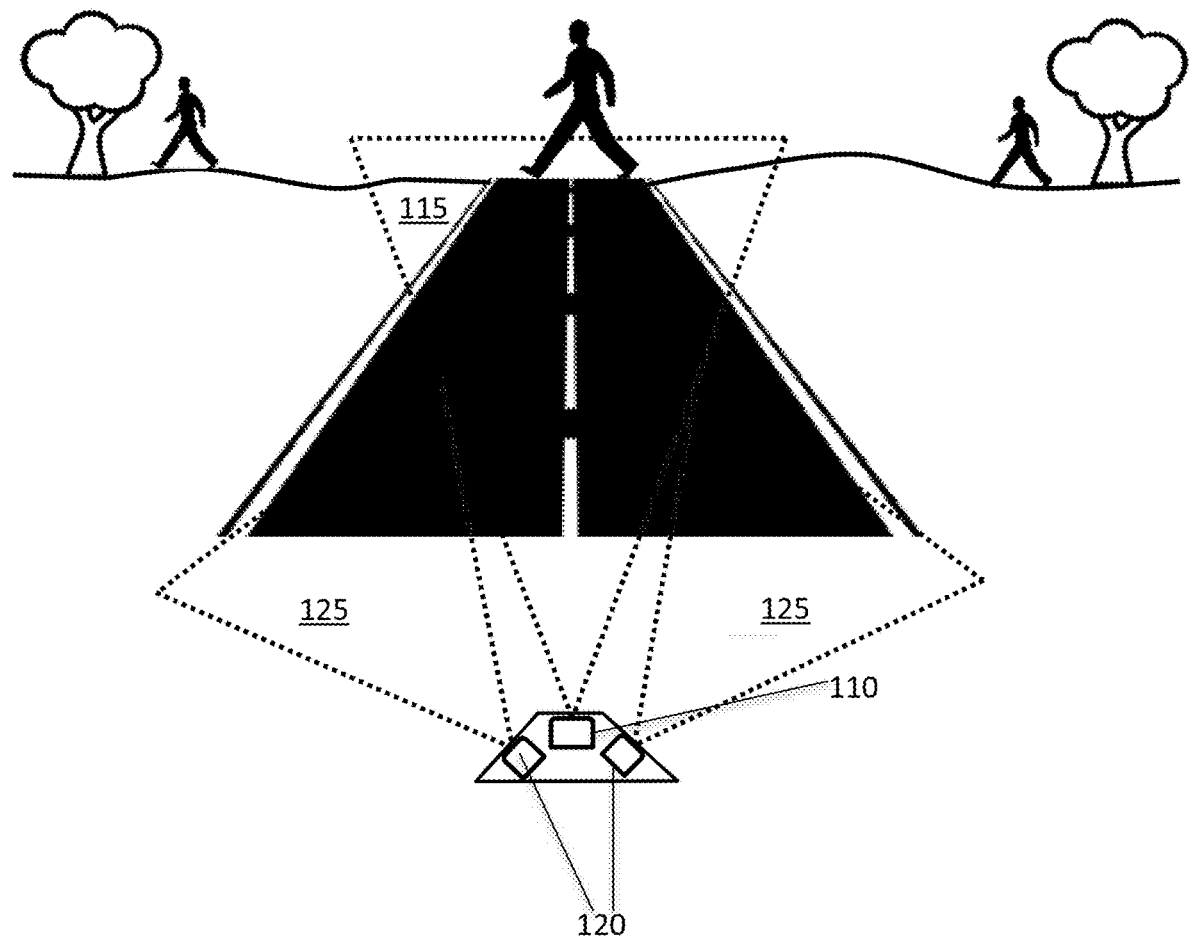
FIG. 3 illustrates the operation of an example multi sensor/multi FOV imaging system.

FIG. 3 shows a practical application of the arrangement of FIGS. 1 and 2. Center imager 110 FOV 115 is narrow and high resolution compared to side looking imagers 120 FOV's 125. Thus, more pixels are devoted to an object (the man in the center) for the center imager 110 than for the same object at the same distance for the side looking imagers 120. It may be desirable to align the FOV's so there is overlap from a suitable distance out (the front of the vehicle or nearly so). If the images for all three were displayed stitched together at once for similarly sized objects at the same distance, the image would appear as shown in FIG. 3.

It is possible and maybe desirable for some cases to actually display the entire composite image. However, it may be more useful to present the data to the vehicle controller and use it intelligently. For example, most of the time, the side image data is not useful and may just add confusion. Even the center thermal image may not be useful for much of the time. Current vehicles don't generally display their visual camera and radar data in image form, but many display it in iconic form showing the relationship of the surrounding space to the vehicle. This information is used for driver awareness, collision warning, and for some vehicles, driver assist safety operation such as automatic braking and side collision avoidance. Such use of the thermal imaging data would be advantageous, and in particular for the arrangement shown the ability to discriminate living objects in the side FOV's would be a significant safety enhancement.

Figure 4A:
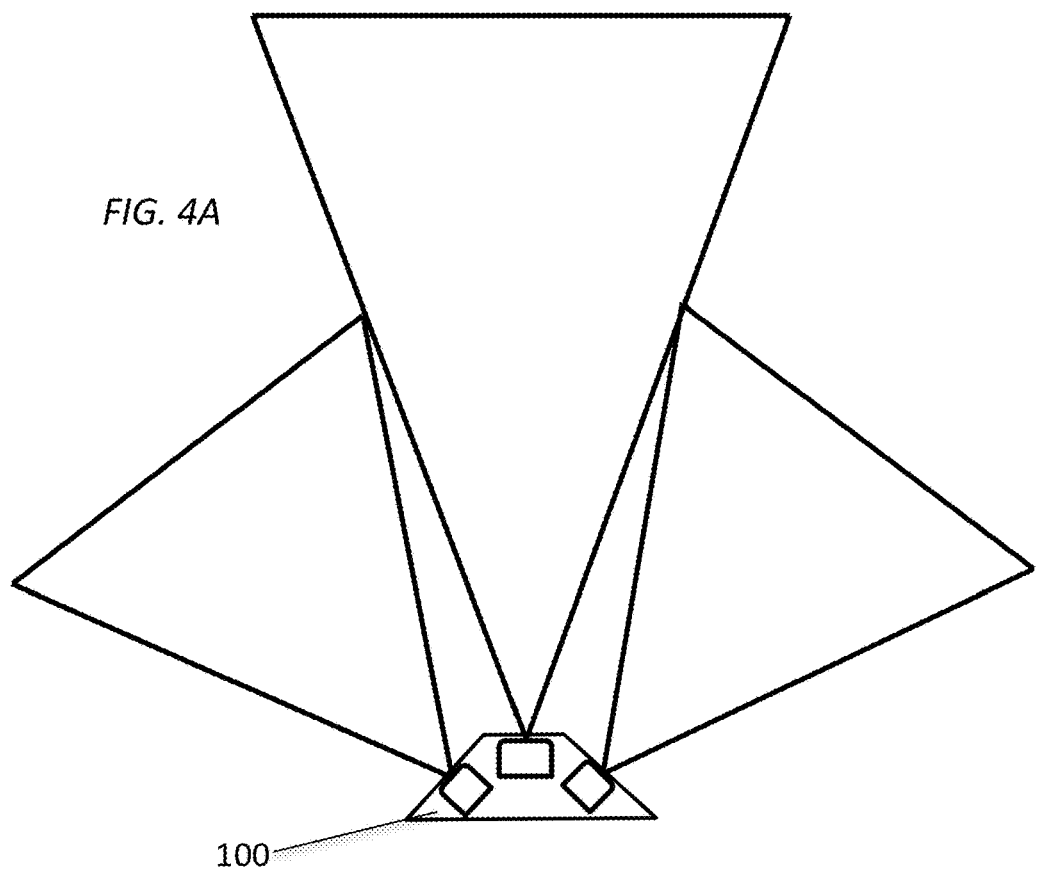
FIGS. 4A and 4B illustrate the application of a forward-looking vehicle application of an example multi sensor/multi FOV imaging system.
Figure 4B:
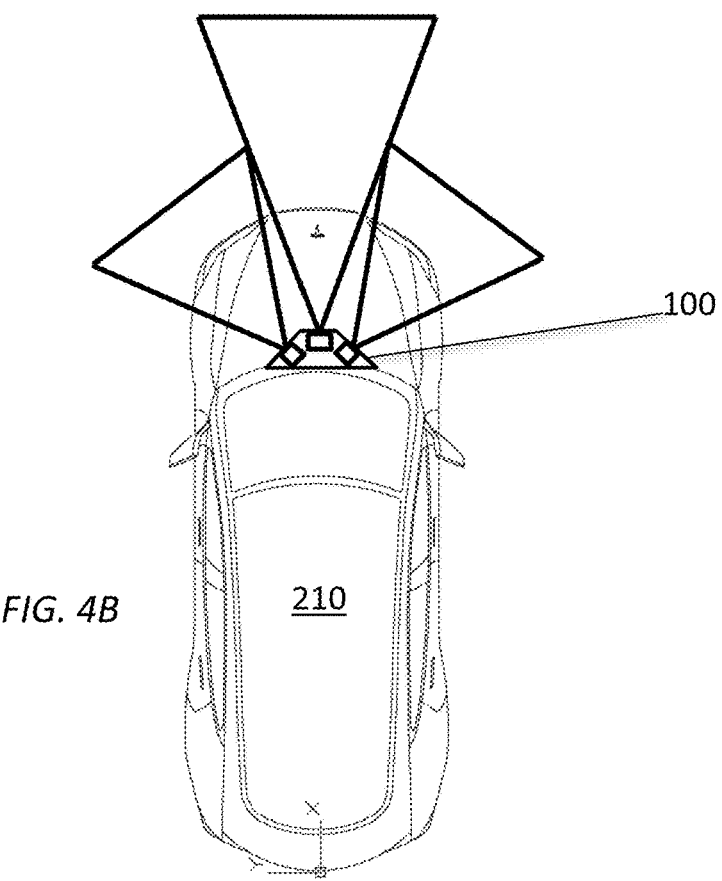

FIGS. 4A and 4B show the application of the forward-looking multi-sensor/multi FOV thermal imaging system to a vehicle. System 100 may be integrated with vehicle 210 in a variety of ways. A simple approach as shown is just to add it either within the existing case or mounted on or adjacent to the forward looking visible camera housing often found at or near the rear view mirror point, in the front grill, on the forward part of the roof, or in other convenient locations. Obviously, the system 100 is not shown to scale. The data provided by the system 100 to the vehicle control system may desirably be compatible with image data used for detection, warnings and driver assistance is already present in many modern vehicles, and not just in the more expensive models.

Figure 5A:
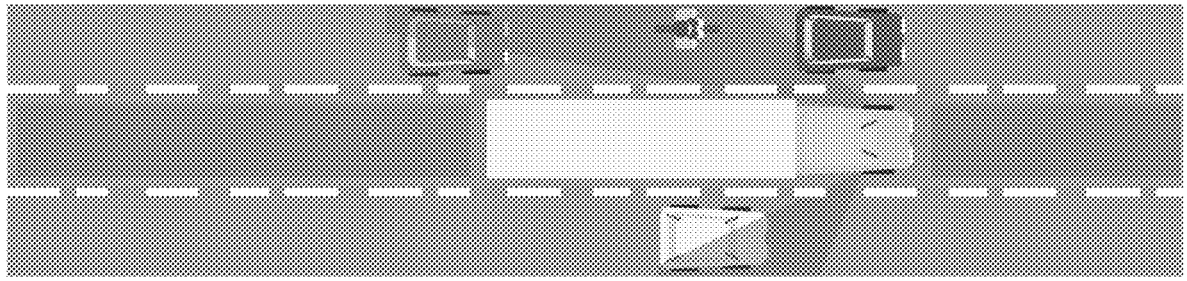
FIGS. 5A and 5B show hazardous aspects of vehicles engaged in towing operations.
Figure 5B:
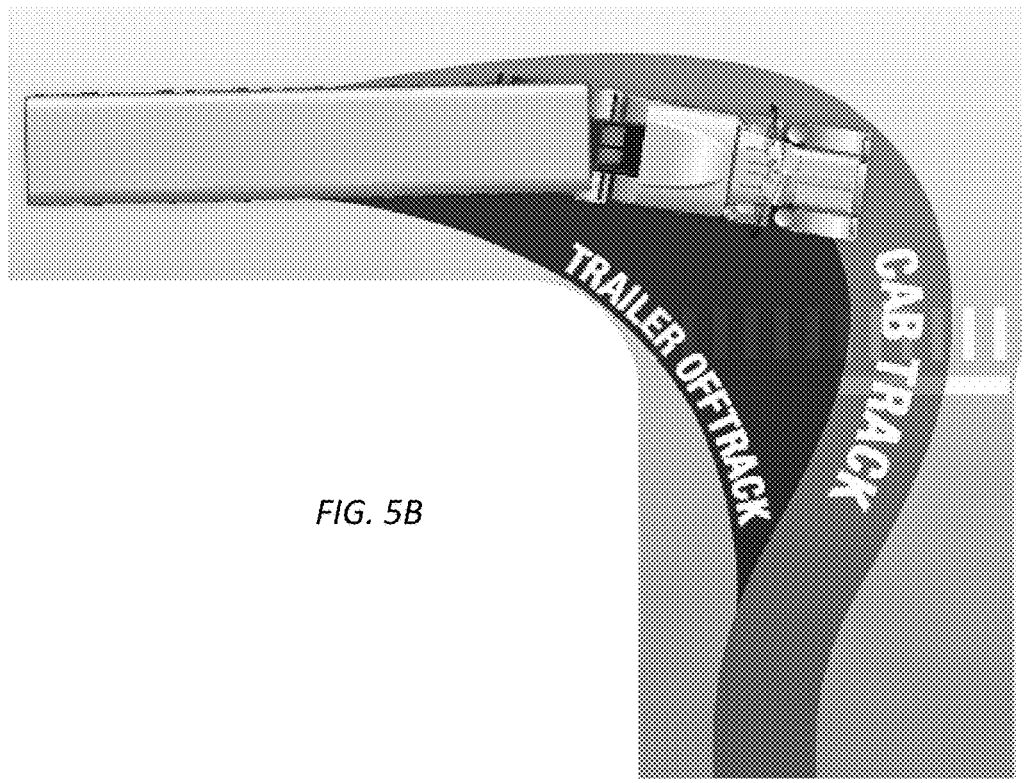

FIGS. 5A and 5B illustrate another vehicle application that could benefit from the multi-sensor/multi-FOV thermal imaging approach. Towing applications, of which Semi trucks are among the most dangerous, suffer from several very dangerous attributes. As shown in FIG. 5A, the driver in a towing application is limited by several blind spots due to the geometry of the vehicle and trailer. Moreover, as shown in FIG. 5B the mechanics of a trailer making a 90 degree turn cause uncontrolled motion of the trailer directly into blind spot areas, as well as "pinch point" behavior of the cab follows too tight a radius. At night, pedestrians or cyclists may be invisible to a driver even when not in these "exclusion zones," and may be virtually undetectable when in them.

Figures 6A, 6B:
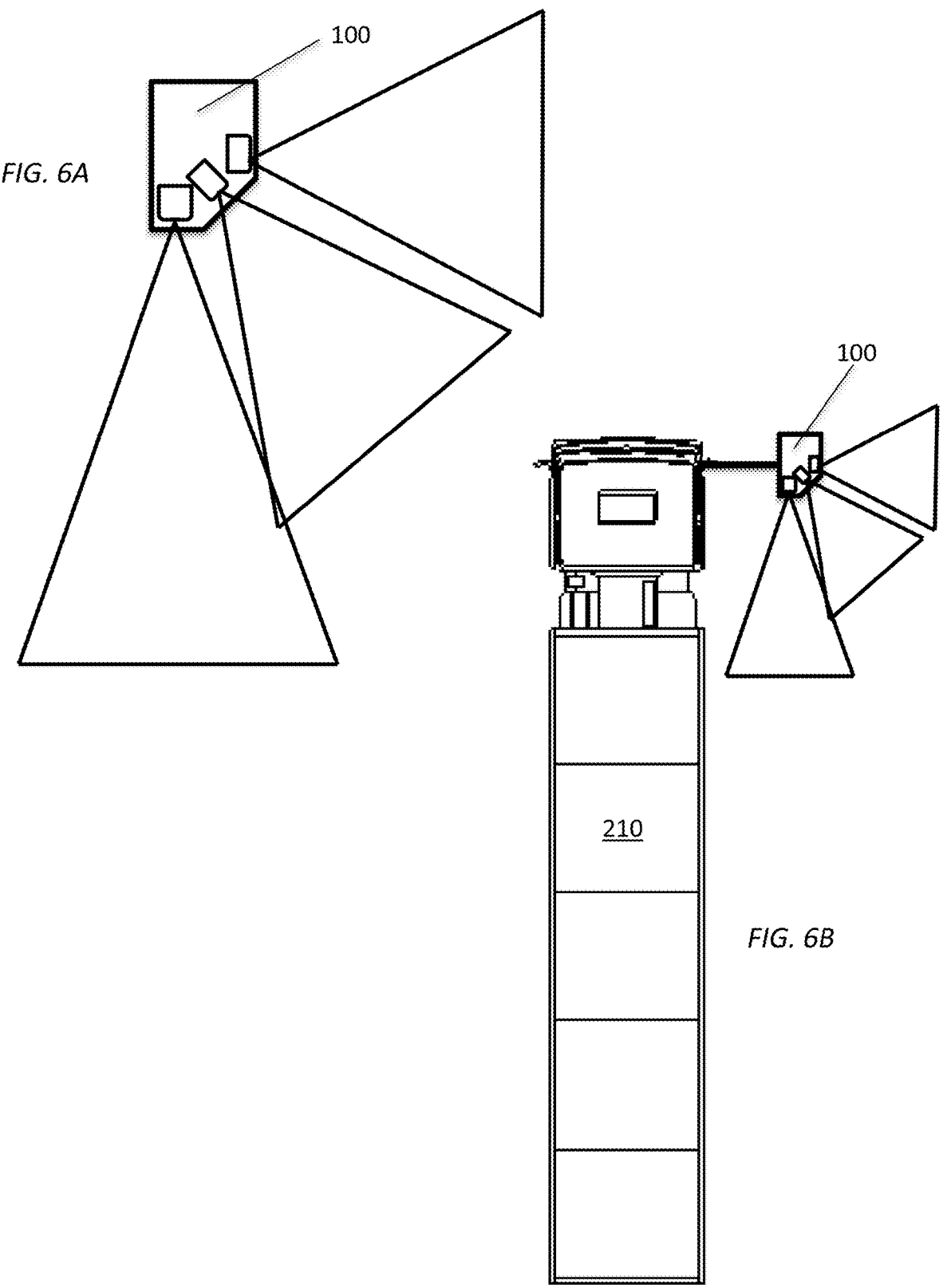
FIGS. 6A and 6B illustrate the application of a rear/side looking towing application of an example multi sensor/multi FOV imaging system.

FIG. 6A shows a multi-sensor/multi-FOV 100 arrangement suitable for towed applications. In this scenario, two side-looking wide FOV sensors are arranged to view the area in the blind spot and turning radius danger zones. Optionally a narrow FOV sensor could be employed to look straight back along the trailer. As shown in FIG. 6B the sensor system 100 could be mounted on one or both sides of the vehicle 210. The side mirror mounts would be one suitable location. Such an arrangement would be capable of determining if living warm objects were in the blind spots or pinch point zones.

FIGS. 7A, 7B, 7C, and 7D show a variety of arrangements for forward looking, rear looking, combined side and 360-degree coverage. All arrangements would benefit from tailoring the resolution and FOV to the expected scenarios at each viewing angle.

Figure 8:
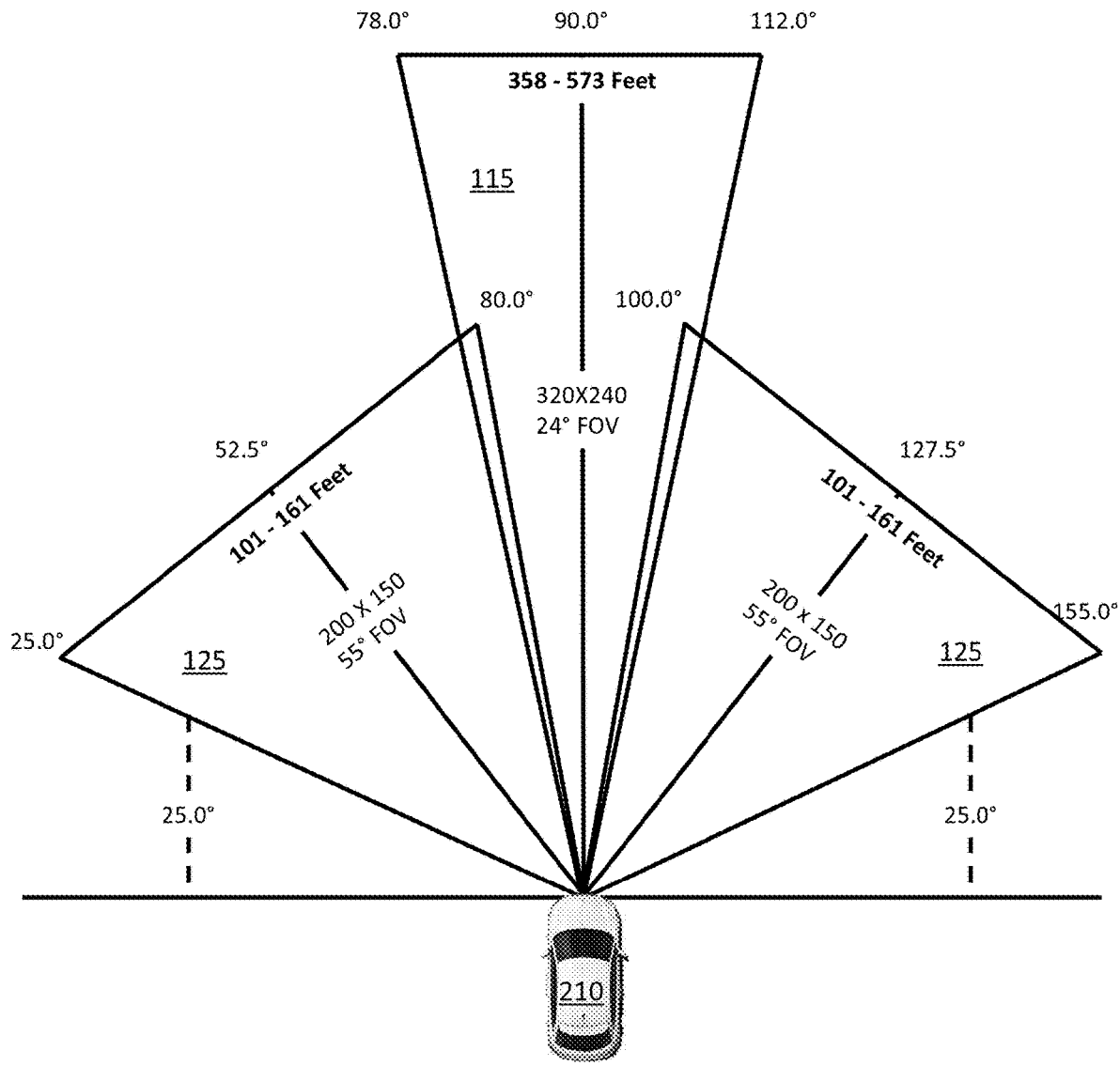
FIG. 8 illustrates details of a particular embodiment of a multi sensor/multi FOV imaging system.

FIG. 8 shows one detailed example forward/peripheral thermal imaging system embodiment of the forward-looking arrangement of FIG. 2. In this detailed embodiment, one QVGA shutterless microcore is used for the center sensor and two shutterless 200×150 pixel microcores are used for the side angle sensors. It will be understood that other types of microcores (e.g., shutterless 208×156 pixel microcores) may equally be implemented. All three with associated optics and support hardware fit into an easily mountable package 16 mm×36 mm×8 mm in dimension. One 15 pin connector is adequate for video, power and control signals. The FOV's and orientation angles shown provide proper coverage for the scenarios described above for the forward-looking system. Obviously, the exact numbers shown are not critical, but are merely exemplary, and any values with a reasonable range of those shown will achieve suitable results. Such a device is easily mountable in many suitable locations, can be made in quantity for a reasonable cost and supplies data easily worked with by modern vehicle controllers with driver assist capabilities.

Figure 7A:
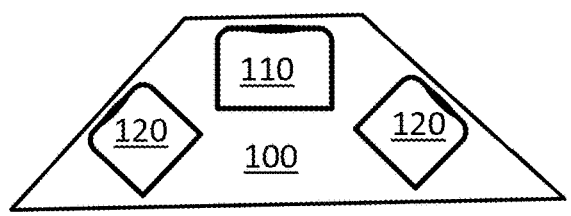
FIGS. 7A, 7B, 7C, and 7D show various exemplary embodiments multi sensor/multi FOV imaging systems.
Figure 7B:
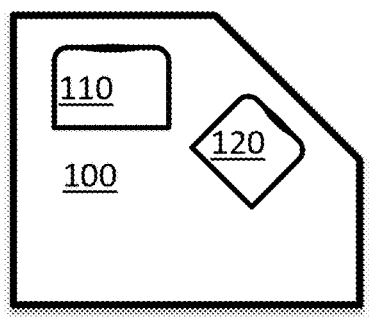
Figure 7C:
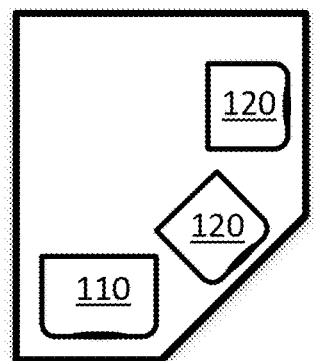
Figure 7D:
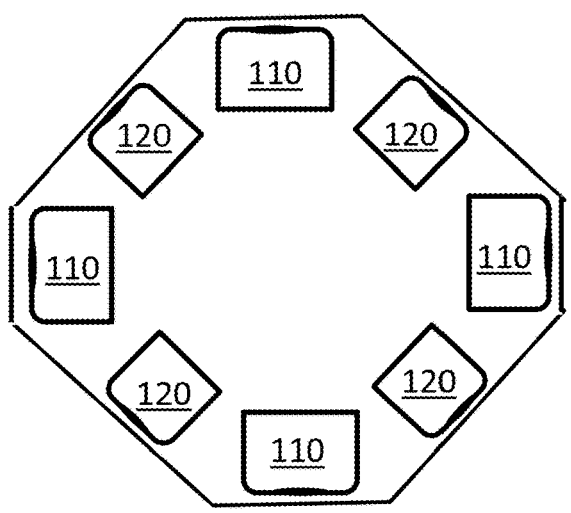
Figure 9A:
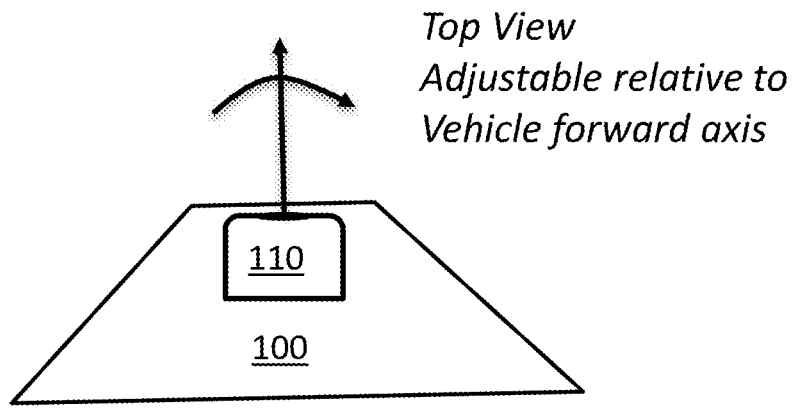
FIGS. 9A and 9B illustrate potential adjustment features for an example multi sensor/multi FOV imaging system.
Figure 9B:
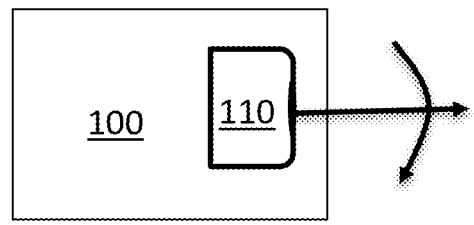

Depending on the application the pointing of the sensors (110, 120, e.g., cores, FPA's, optical elements, etc.) may require adjustment. FIG. 9A shows imaging system 100 adjustment relative to the vehicle motion axis, which we have already implied would be set differently for each vehicle. However, it may also be desirable to adjust the pointing of the sensors, as shown in FIG. 9B, up or down relative to the ground. For example, a 360-degree view system such as shown in FIG. 7D may have to be mounted high enough to clear all viewing constructions so it may be desirable to aim the sensors down to compensate. Similarly, if a rear-side looking system is mounted on a semi-truck mirror mount, it may be desirable to aim each sensor at a different up/down angle depending on the location of the exclusion zones vertically.

Figure 10A:
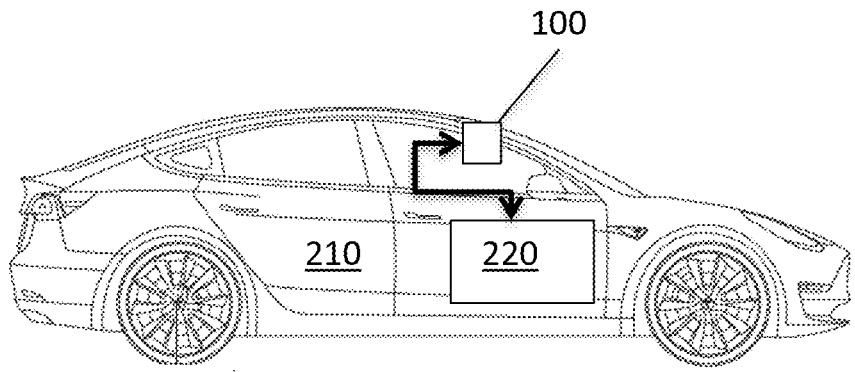
FIGS. 10A, 10B, and 10C show various exemplary embodiments for vehicle integration for multi sensor/multi FOV imaging systems.
Figure 10B:
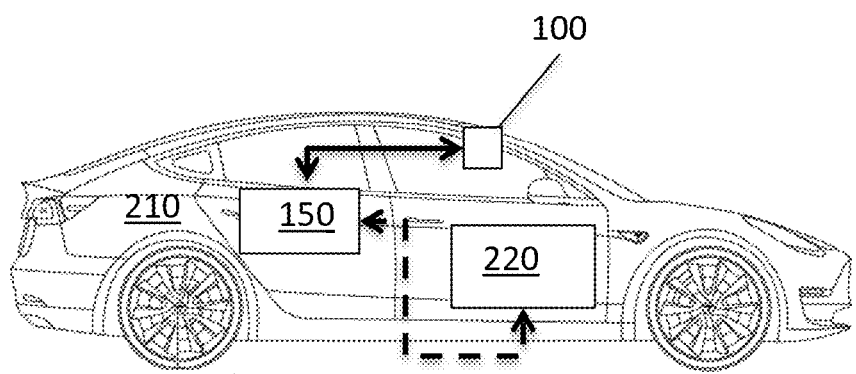
Figure 10C:
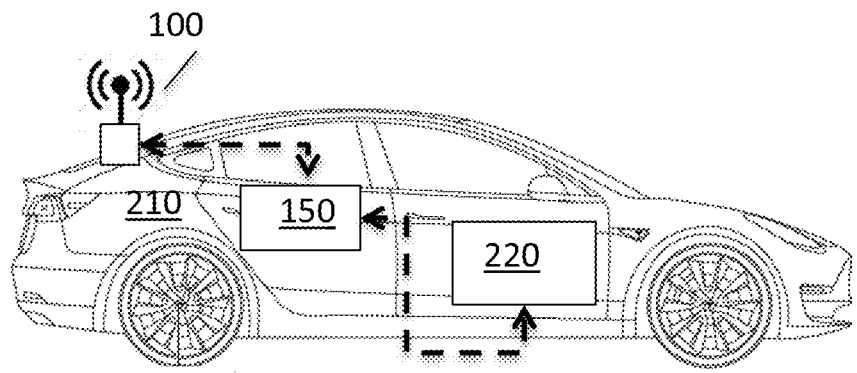

There are a variety of options for integrating the multi-sensor/multi-FOV imaging system 100 with a vehicle 210 as shown in FIGS. 10A, 10B, and 10C. One advantageous way is to design the system into the vehicle from the beginning to get the maximum benefit of having all the angles and FOV's tailored to the vehicle and mounting location, as well as having the data available and usable to the vehicle controller for all the reasons discussed above. This configuration is shown in FIG. 10A, where system 100 is mounted at manufacture to the vehicle 210 and seamlessly power and signal interfaced to the vehicle controller 220.

However, there is no reason that the system can't be an aftermarket accessory akin to back-up cams and dash cams which with a bit of effort can be wired into an existing vehicle. In this arrangement shown in FIG. 10B, There may be a dedicated controller/display 150 system which may or may not be connected to vehicle controller 220. The dedicated controller could be a user smartphone, tablet, or the like or could be purpose-built accessory. The connection to the controller could be wireless or wired. In this scenario, that adjustability shown in FIGS. 9A and 9B may be important as each vehicle/mounting position may require different aiming of the sensors.

As shown in FIG. 10B, for some applications it may be desirable to make all or part of the sensor system 100 removable or temporarily installable. For instance, towing applications may require a rear looking sensor be placed when a trailer is hooked up. For example, may semi drivers don't always pull the same trailer so the driver may want to temporarily install sensors on each trailer he contracts to tow. In this scenario, the removable portion of the system may be battery powered and interface wirelessly in some embodiments.

Figure 11:
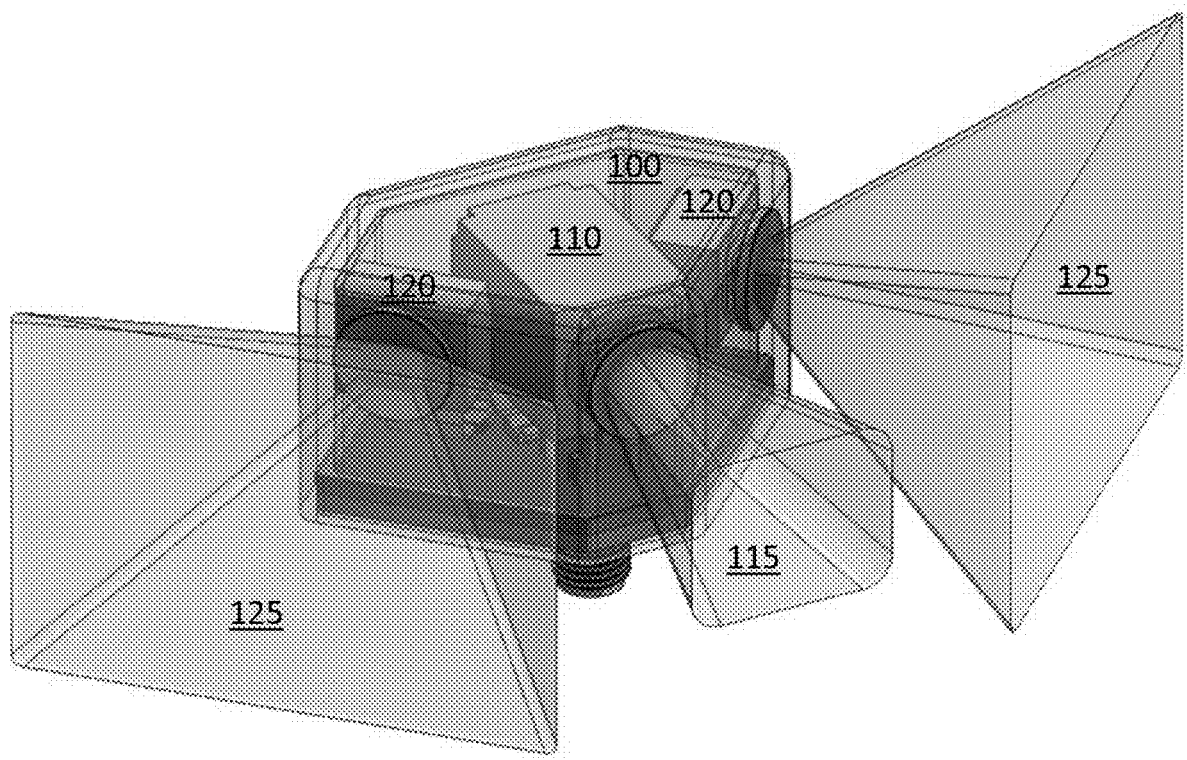
FIG. 11 illustrates another example embodiment of a three-sensor forward-looking multi senor/multi FOV imaging system.
Figure 12:
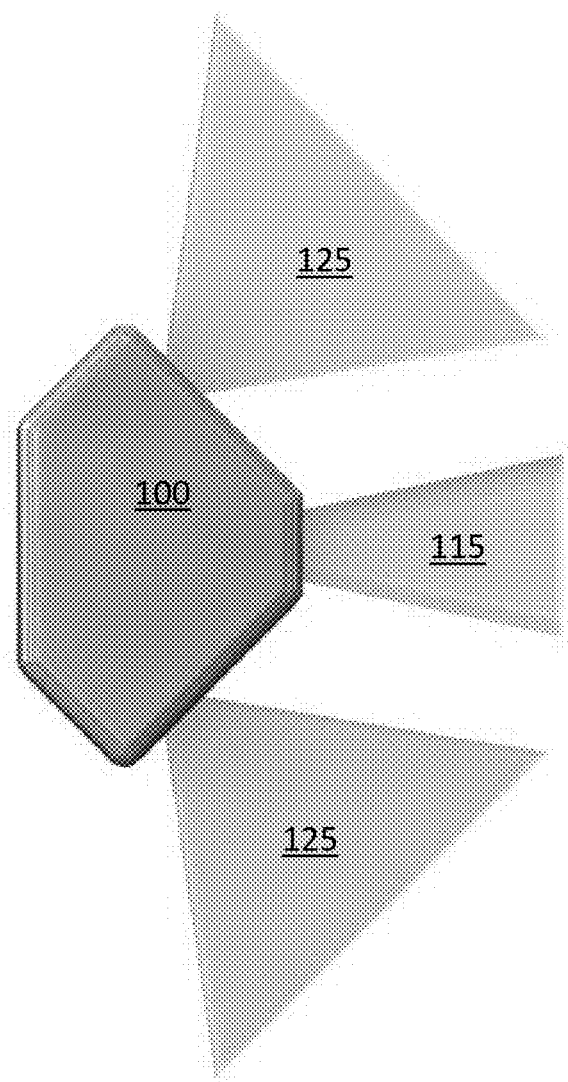
FIG. 12 illustrates another view of the embodiment of FIG. 11.

A particular example solution for a forward/peripheral looking multi-thermal sensor system 100 is shown in FIGS. 11 and 12. For this solution, the sensors are shutterless micro-cores providing a horizontal composite 180-degree FOV using three (3) 200×150 pixel sensors, one pointing forward and two pointing peripherally. The two peripheral sensors 120 use a 1.9 mm f/1.1 lens providing a peripheral FOV 125 of 81° H×59° V. each. The center sensor 110 each use a 6.5 mm f/1.0 lens providing a center FOV 115 of 24° H×16° V. The sensors are mounted co-axially vertically (V) and with a two degree overlap horizontally (H) providing a 180-degree horizontal composite field of view (HFOV).

The system 100 for this particular embodiment may be a roof mounted design Roof Design, and the package for this particular configuration is 28×43.6×22.5 mm L×W×H, ~19,000 cubic mm or ~1.16 cubic inch, in a trident shape as shown. A mount on the forward end of the roof may minimize the collection of debris as housing placement on the front of the roof provides potential access to the windshield fluid system for cleaning.

Also envisioned for the exemplary embodiment is to utilize a diamond-like coating (DLC) on the optics instead of a more typical outside window. This arrangement removes a temperature delta between the optics and window (typically germanium) allowing for higher performance, including better Modulation Transfer Function (MTF) for improved object detection. This coating allows for the optics to be implemented as at least one exterior facing lens, which in some cases may be the only optics needed. The lens coating will enable a single exterior facing lens, coated on at least the exterior facing side of the lens, as the coating will protect against impacts from road debris and will allow for convenient cleaning due to inherent abrasion resistance.

It is envisioned that system 100 will include two or more thermal imaging sensors interfaced to a controller that at a minimum performs control, configuration and calibration data management of the thermal sensors, resulting in either three serial video streams or possibly one serial video stream comprising a stitched together video stream of the composite image from the imaging sensors. These control functions could be performed in any suitable logic or programmable device including an FPGA, ASIC, or processor.

Figure 14:
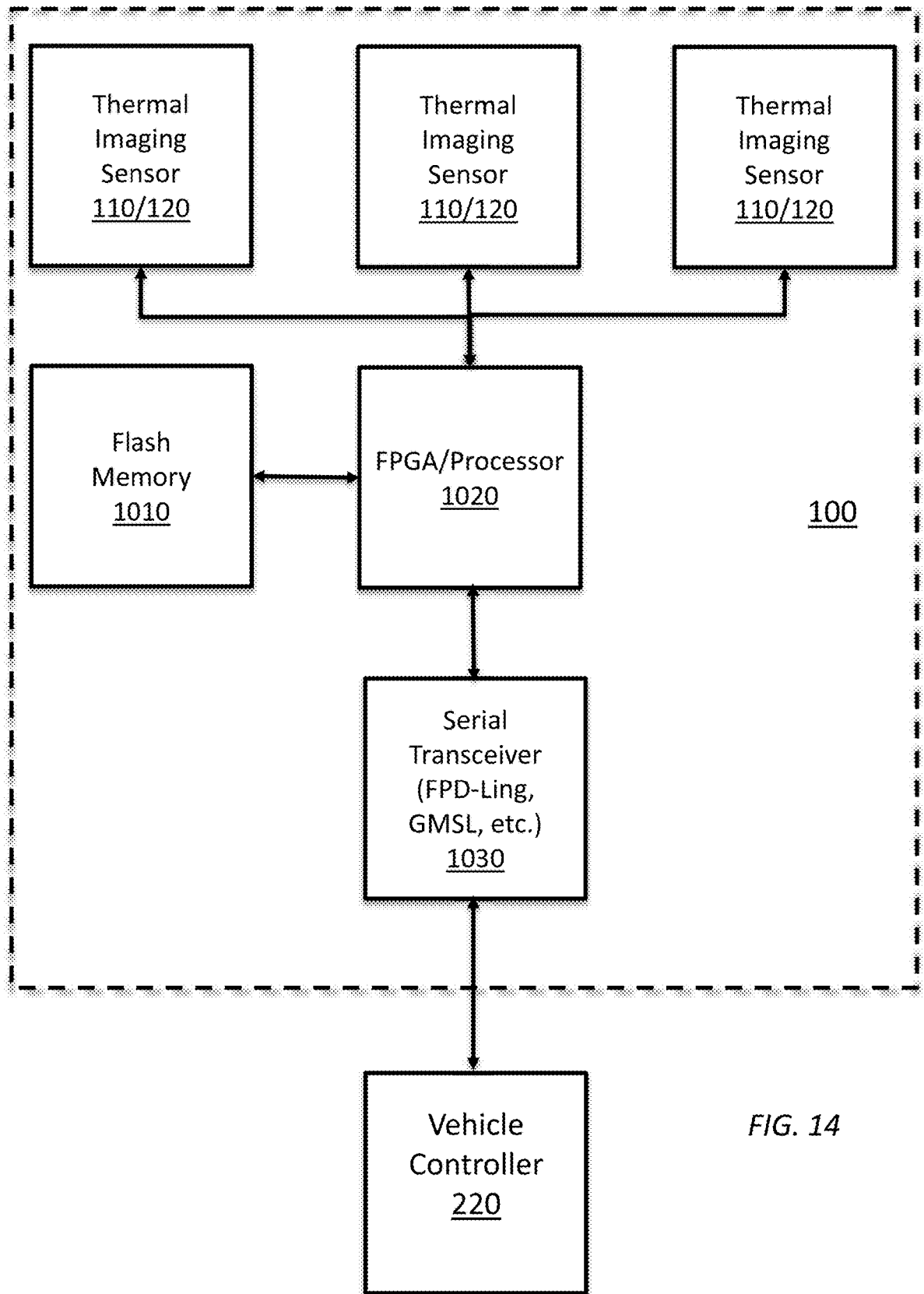
FIG. 14 is a block diagram illustrating an example multi-sensor system.

A Block Diagram showing generally the elements likely to be needed is shown in FIG. 14, for a three sensor 110/120 system 100. The sensors 110/120 can be controlled and accessed by one or more logic elements 1020 such as programmable controllers, or for some cases FPGA's or ASIC's. A Memory element such as flash memory 1010 can be provided for storing programming steps, calibration data or other necessary data needed for operation. Finally, the control logic can format the video data from the sensors as appropriate and via a transceiver 1030, for example a serial video data transceiver, and can pass the data to the vehicle controller 220. One common data link for automotive ADAS/video camera interfaces is FPD-Link, while another common camera interface is GMSL (gigabit multimedia serial link). Other auto manufacturers may use common data interfaces such as USB and ethernet. Depending on the preference of the vehicle designer, the system may pass any type of processed video to the vehicle controller ranging from raw video to fully imaged processed video with some or all of the common thermal image processing elements such as Non-Uniformity Correction (NUC). noise filtering, thermography and the like. The signal processing trade-off between the vehicle controller and the imaging system itself can drive the system design, where for less processing at the system level, simpler logic elements such as FPGA's may suffice, while if fully processed video is delivered to the vehicle, more powerful and programmable logic may be needed.

Typical automotive video connectivity can include 8-bit data streams combined into a single serializer used for visible cameras (e.g., RGB). For the thermal system 100 embodiment, three separate data outputs (e.g., R=left side sensor, G=center sensor and B=right side sensor) may be combined onto a single serializer for multiple sensor output, as one particularly convenient approach to passing multi camera data efficiently.

Figure 13:
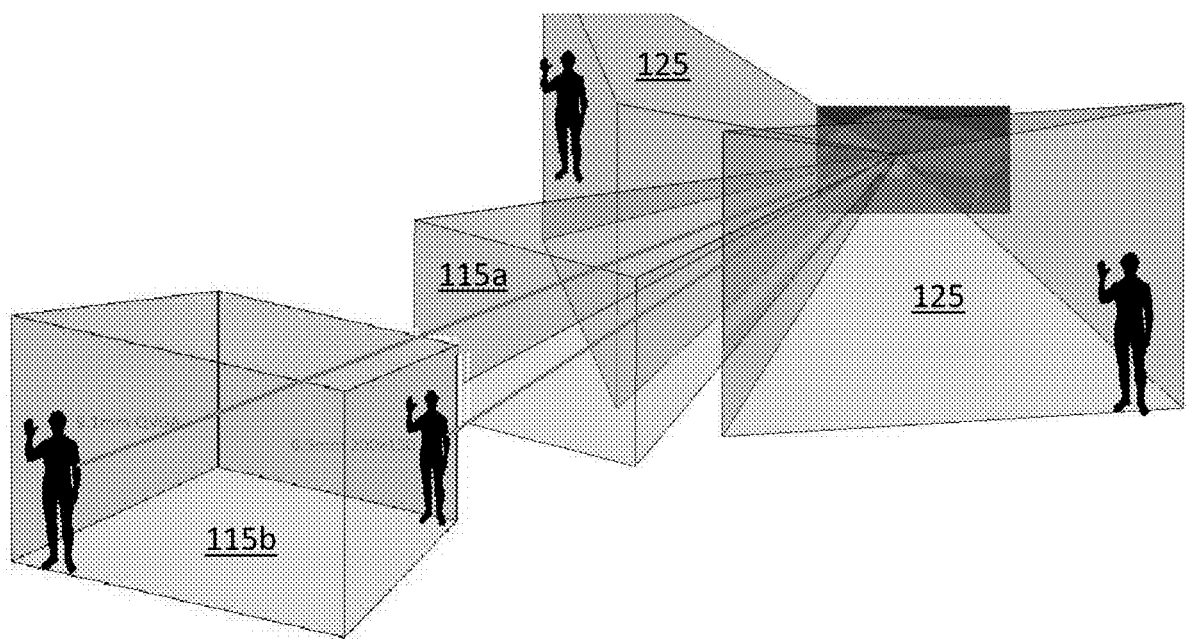
FIG. 13 illustrates an example of performance trade-offs associated with sensor resolution.

It is also possible as described above, to utilize differing pixel resolution sensors for the center and peripheral imagers in the embodiment of FIGS. 11 and 12. FIG. 13 shows an example of resolution at range improvement 115a compared to 115b, when, for example, the center sensor is replaced with a QVGA thermal camera as opposed to the 200×150 sensor described above. Any suitable sensor, including higher pixel resolution imagers such as HVGA, VGA, or higher may be suitable for any of the sensors in any of the embodiments disclosed herein, depending on the intended use if the system.

Depending on the embodiment, certain acts, events, or functions of any of the processes described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and process steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processor configured with specific instructions, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. For example, the LUT described herein may be implemented using a discrete memory chip, a portion of memory in a microprocessor, flash, EPROM, or other types of memory.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. A software module can comprise computer-executable instructions which cause a hardware processor to execute the computer-executable instructions.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, and Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to illustrative embodiments, it will be understood that various omissions, substitutions, and changes in the form and details of the devices or processes illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system for enhancing vehicular operation, comprising:
   a sensor carrier configured for mounting to at least one selected location on a vehicle;
   at least three thermal imaging sensors, each sensor comprising a thermal imaging Focal Plane Array (FPA) and associated interface and signal processing elements, each FPA including a number of pixels defining the image resolution of the FPA, configured for mounting to the sensor carrier; and
   optics associated with each sensor defining the Field of View (FOV) of each sensor;
   wherein a first sensor of the at least three thermal imaging sensors has a higher resolution compared to second and third sensors of the at least three thermal imaging sensors, and a first defined FOV angle of less than 30 degrees, including 24 degrees, the first sensor disposed in the sensor carrier at a first viewing angle with a viewing axis aligned substantially to a forward orientation of the vehicle, and
   wherein the second and third sensors have a lower resolution compared to the first sensor, and a second defined FOV angle of greater than 45 degrees, including one of 81 or 55 degrees, the second and third sensors disposed in the sensor carrier on opposing sides of the viewing angle of the first sensor at second viewing angles with viewing axes greater than 20 degrees from the viewing axis of the first sensor, including the range of 28 to 30 degrees.

2. The system of claim 1, wherein the at least two thermal imaging sensors comprise one or more of:
   a camera core with shutter and optics;
   a shutterless camera core; or
   a microchip mounted to a substrate.

3. The system of claim 2, wherein the sensor carrier includes one or more of:
   a separate package configured to mount at least one of cores, optical elements, or substrates; or
   mounting provision in another vehicle element.

4. The system of claim 3, wherein the sensors have a configuration comprising three shutterless thermal camera cores mounted in a package whose footprint is less than 20×40 mm.

5. The system of claim 4, wherein the configuration of the sensors is three shutterless thermal camera cores mounted in a package whose footprint is substantially 16×36 mm.

6. The system of claim 1, wherein the first sensor is configured to have a horizontal FOV angle of substantially 24 degrees and the second and third sensors have viewing axis of substantially 28 to 30 degrees from the forward looking sensor viewing axis, and a horizontal FOV of substantially 81 degrees, providing a total composite horizontal FOV (HFOV) of 180 degrees.

7. The system of claim 1, wherein the first sensor is configured to view a range of less than 1000 feet, and the second and third sensors are configured to view a range of less than 200 feet.

8. The system of claim 7, wherein the first sensor is configured to view a range substantially within 378 to 573 feet, and the second and third sensors are configured to view a range substantially within 101 to 161 feet.

9. The system of claim 1, wherein the first sensor comprises at least one of a QVGA FPA or a 200×150 pixel FPA and the second and third sensors each comprise a 200×150 pixel FPA.

10. The system of claim 1, wherein image data acquired by the sensors is provided to a vehicle control/display system and acquired sensor data is at least one of:
displayed simultaneously to a driver;
selectively displayed to a driver; or
processed to provide at least one of driver warnings or assisted driving actions.

11. The system of claim 1, wherein the viewing angles of the sensors may be adjusted in both orientation relative to the forward orientation of the vehicle and relative to a road plane to account for mounting position on the vehicle and desired FOV.

12. The system of claim 11, wherein the adjustments are at least one of fixed at installation or dynamically adjustable during use.

13. The system of claim 1, wherein the system is configured as at least one of:
at least one sensor directly forward looking and at least one sensor looking off angle to the forward-looking sensor, mounted to view forward;
at least one sensor looking backward and at least one sensor looking off angle to the rear viewing sensor, mounted to at least one of the rear or to one side of a vehicle; or
a plurality of sensors mounted to look at 360 degrees around the vehicle, and mounted and aimed to cover desired FOV's.

14. A method of using any combination of the sensor systems as described in claim 13 to enhance operation of vehicles engaged in towing, wherein the system is interfaced to a vehicle control and display system, the method comprising:
producing at least one of thermal images or thermal image derived data of space directly to the rearward right of a vehicle using a lower FOV sensor and of the space to the rearward right of the vehicle using an angled higher FOV sensor; and
providing at least one of thermal data display, warnings, or driver assist operations if objects are detected to the rear or in the direction of an indicated turn.

15. The system of claim 1, wherein the system is powered by and interfaced to a control and display system of the vehicle, and is designed into the vehicle.

16. The system of claim 1, wherein the system is an aftermarket accessory and is at least one of configured with a dedicated processor and display or interfaced to a control and display system of the vehicle.

17. The system of claim 1, wherein the sensors are battery powered and configured for the placement of the sensors in a temporary location depending on need and wherein the system is wirelessly interfaced to at least one of a dedicated controller or a vehicle controller of the vehicle.

18. A method of using a sensor system as described in claim 1 to enhance vehicle operation, wherein the system is interfaced to a vehicle control and display system, the method comprising:
producing at least one of thermal images or thermal image derived data of space in front of a vehicle and of the space to the forward right and left of the vehicle; and
providing at least one of thermal data display, warnings, or driver assist operations if objects are detected in a direction of travel or in a direction of an indicated turn.

19. The system of claim 1, wherein the sensor carrier is configured for mounting on a forward end of a roof of the vehicle to minimize collection of debris and to provide access to a windshield fluid system for cleaning.

20. The system of claim 1, wherein the optics comprise at least one lens as an exterior element and a diamond-like coating (DLC) on at least an exterior-facing portion of the at least one lens.

* * * * *